United States Patent
Nafziger, Jr. et al.

[11] Patent Number: 5,560,140
[45] Date of Patent: Oct. 1, 1996

[54] FISHING PLUG LURE AND SPINNER

[76] Inventors: Ralph L. Nafziger, Jr., 3232 Gillham Rd., Kansas City, Mo. 64109; Alvin E. Stewart, 2900 Hagemann, Kansas City, Kans. 66106

[21] Appl. No.: 136,239

[22] Filed: Oct. 15, 1993

[51] Int. Cl.⁶ ............................................. A01K 85/00
[52] U.S. Cl. ................ 43/42.06; 43/42.17; 43/42.22; 43/42.36; 43/57.1
[58] Field of Search ........................ 43/42.06, 42.19, 43/42.22, 42.35, 42.36, 57.1, 42.17

[56] References Cited

U.S. PATENT DOCUMENTS

| | | | |
|---|---|---|---|
| 4,158,927 | 6/1979 | Capra et al. | 43/42.19 X |
| 4,520,588 | 6/1985 | Hindermyer | 43/42.06 |
| 4,553,348 | 11/1985 | Cooper | 43/42.06 |
| 4,703,579 | 11/1987 | Kay | 43/42.19 |
| 4,930,245 | 6/1990 | Bazzano | 43/42.06 X |
| 5,054,230 | 10/1991 | Woodman | 43/42.06 X |

*Primary Examiner*—J. Elpel

[57] ABSTRACT

A device for catching fish that can be used as a Plug, Lure or as a Spinner. Basically it has a bait containment cavity and a lid held in place by spring tension, extra hooks which may be slidably pulled up a wire, out of storage, down a slot and twisted into a quick release coil, which positions it for catching a fish. The device also has a bouyant spinner which gives different actions to the lure while trolling through water. A removable eyelet is provided allowing easy cleaning and experimentation with different size spinners. Furthermore styrofoam strips may be attached to the spinner causing different actions of the device so as to attract fish.

6 Claims, 1 Drawing Sheet

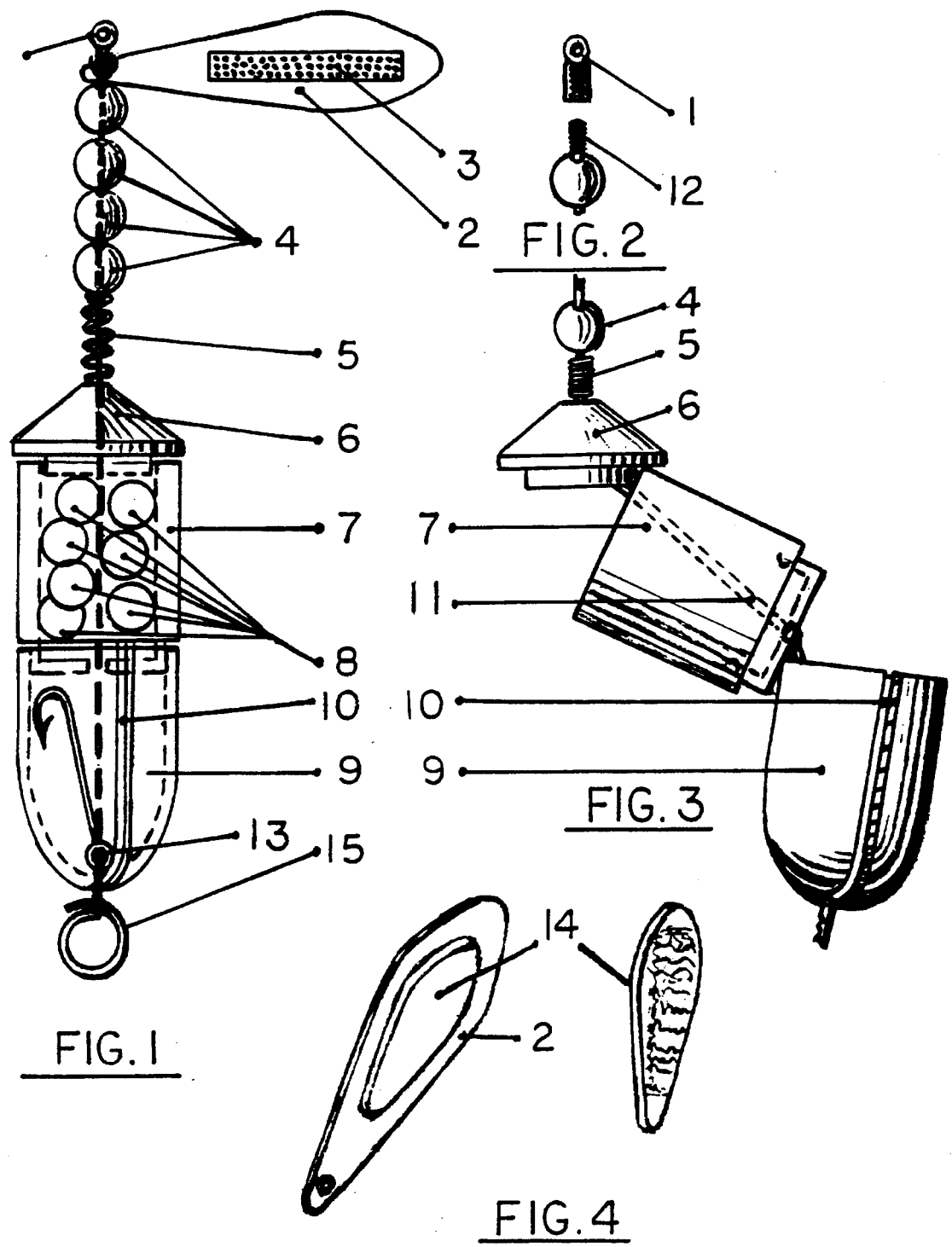

FISHING PLUG LURE AND SPINNER

BACKGROUND OF THE INVENTION

1. Field of the Invention

The invention relates generally to a device which attracts and hooks fish.

2. Description of the Prior Art

Most fishing devices, unless they have a bobber, sink to the bottom and may get entangled at the bottom of a lake, stream etc. This invention allows adjustable flotation by the changings of flotation devices attached to the spinner mechanism. Also it is sometimes difficult to remove the hooks from inside of a fish. furthermore most fishing devices don't seem like live bait to fish. This invention eliminates the aforementioned problems Sometimes removing a hook from a fish requires the use of pliers in order to remove the hook from the fish. The quick release coil eliminates this practice.

SUMMARY OF THE INVENTION

The invention relates to a device to aid a fisherman to catch fish by placing bait inside of a see through tubular capsule and allowing a small amount of water to ooze through it will put the scent or taste of live bait in the water. Also float attachments can be attached to the spinner to cause different actions of the plug or lure when trolled in the water. The invention further provides extra hooks and a quick release mechanism for quickly leaving the hook inside of the fish and finally provides a new hook by the manually pulling of a new hook up over and back down a slot cut out in the side of the hook storage unit.

BRIEF DESCRIPTION OF THE DRAWINGS

FIG. 1 is a view of a fish catching device shown in its entirety consisting of a spinner, bait capsule, hook storage compartment and a quick release hook release coil.

FIG. 2 is a section view of the threadably removable eyelet which allows for changing the size of the spinners and easy cleaning of all parts.

FIG. 3 is a view showing both the bait storage compartment and the hook storage compartment open.

FIG. 4 is a view of the spinner with a styrofoam float attached and a styrofoam float.

DESCRIPTION OF THE PREFERRED EMBODIMENT

Referring to FIGS. 1 and 3, an embodiment of the fishing lure, plug and spinner is shown. FIG. 1 is a view showing a spinner 2, a bait container capsule 7 having salmon eggs 8 therein, a storage compartment 9 connected to the capsule 7, wherein the storage compartment 9 has a slot 10 and an extra fish hook 13 stored therein, and the spinner 2, capsule 7, and storage compartment 9 having a resilient wire 11 extending therethrough, the wire 11 having a eyelet 1 at one end for attachment of a fishing line and a quick release coil 15 on an opposing end for attachment of a fishing hook. FIG. 1 also shows the fishing device having round beads 4 which are grasp as a handle when pulling to open a bait capsule lid 6, thereby compressing spring 5. And, the invention further includes "VELCRO" 3, a hook and loop material, for attaching a float 14 to spinner 2. Wire 11 is attached to eyelet 1 via threads 12.

We claim:

1. A fishing plug, lure, and spinner combination comprising;

a spinner, a bait capsule for holding bait therein, a storage compartment for holding spare fishhooks therein, and a wire extending through each of the spinner, the bait container, and the storage compartment, wherein the wire is attached to a fishing line at one end, and to a spiral shaped quick release coil on an opposing end for releasably holding a fishhook.

2. The fishing plug, lure, and spinner combination of claim 6 wherein the bait capsule has a lid attached thereto and said lid held in place by pressure from a spring, and wherein the wire extends through the lid and the spring.

3. The fishing plug, lure, and spinner combination of claim 2 wherein the storage compartment is separably connected to the bait capsule, and at least one fishhook is stored in said storage compartment, said at least one fishnook attached to the wire.

4. The fishing plug, lure, and spinner combination of claim 3 wherein the storage compartment has a slot therein for moving said at least one fishhook from said storage container to said quick release coil.

5. The fishing plug, lure, and spinner combination of claim 1 wherein a float is releasably attached to the spinner.

6. The fishing plug, lure, and spinner combination of claim 5 wherein the float is releasably attached to the spinner with hook and loop threads 12.

* * * * *